Figure 1:
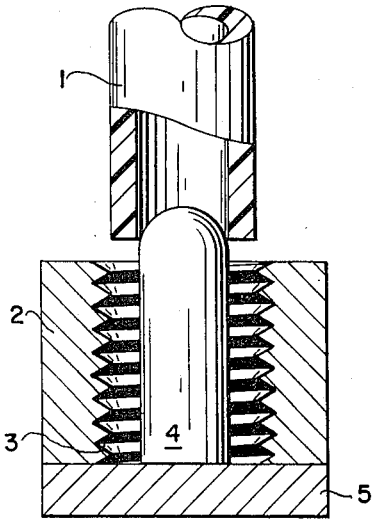
Figure 2:
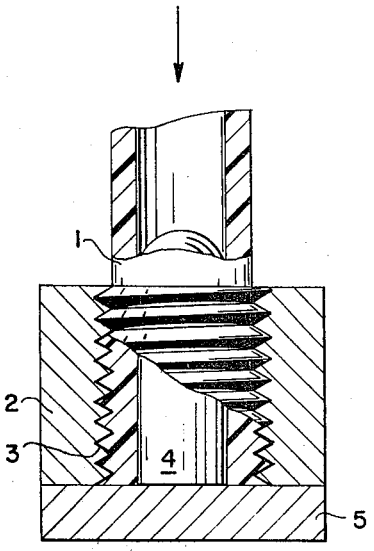
Figure 3:
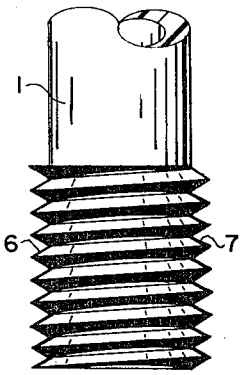

DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED JUNE 9, 1970

875 O.G. 342

T875,012
THREADING OF PLASTIC PIPE
Howard K. Hobbs, Rte. 3, Blountville, Tenn. 37617
Filed Dec. 12, 1969, Ser. No. 884,425
Int. Cl. F16l *9/12, 11/12*
U.S. Cl. 138—109
1 Sheet Drawing. 8 Pages Specification

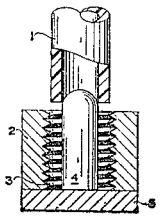

Threading polyethylene pipe to avoid reducing its diameter is accomplished by heating the end portion of the pipe on which threads are to be placed to the softening point and then forcing the softened portion completely into a closed-end cylindrical mold provided with internal threads of the desired depth, pitch and length. The mold is also provided with an internally disposed mandrel of approximately the same internal diameter of the pipe and rigidly attached to the closed end thereof, providing means whereby the softened plastic of the pipe structure will completely fill the threads of the mold along the length of the mandrel. Upon cooling, the thus threaded pipe can be unscrewed from the mold end and will have the desired threads externally disposed thereon without reduction of the diameter of the pipe and without reduction in its original pressure rating as determined by standard pressure rating tests.

June 9, 1970 H. K. HOBBS T875,012

THREADING OF PLASTIC PIPE

Filed Dec. 12, 1969

HOWARD H. HOBBS
INVENTOR.

BY Charles L. Good

ATTORNEY